(12) United States Patent
Kustra et al.

(10) Patent No.: US 10,357,092 B2
(45) Date of Patent: Jul. 23, 2019

(54) SYSTEM AND A METHOD FOR GUIDING A USER DURING A SHAVING PROCEDURE

(71) Applicant: KONINKLIJKE PHILIPS N.V., Eindhoven (NL)

(72) Inventors: Jacek Lukasz Kustra, Eindhoven (NL); Guido Theodorus Gerardus Volleberg, Eindhoven (NL); Stefan Pfundtner, Eindhoven (NL); Karl Catharina Bree, Eindhoven (NL); Petrus Johannes Arnoldus Hubertus Kuijten, Eindhoven (NL); John Cornelius Petrus Van Der Ven, Eindhoven (NL); Harry Broers, Eindhoven (NL)

(73) Assignee: KONINKLIJKE PHIILPS N.V., Eindhoven (NL)

( * ) Notice: Subject to any disclaimer, the term of this patent is extended or adjusted under 35 U.S.C. 154(b) by 12 days.

(21) Appl. No.: 15/032,065

(22) PCT Filed: Oct. 27, 2014

(86) PCT No.: PCT/EP2014/072932
§ 371 (c)(1),
(2) Date: Apr. 26, 2016

(87) PCT Pub. No.: WO2015/067489
PCT Pub. Date: May 14, 2015

(65) Prior Publication Data
US 2016/0262521 A1   Sep. 15, 2016

(30) Foreign Application Priority Data

Nov. 6, 2013   (EP) ..................................... 13191733
Jun. 18, 2014  (EP) ..................................... 14172936

(51) Int. Cl.
*A45D 24/36* (2006.01)
*A45D 27/00* (2006.01)
(Continued)

(52) U.S. Cl.
CPC ............. *A45D 24/36* (2013.01); *A45D 27/00* (2013.01); *A45D 44/005* (2013.01);
(Continued)

(58) Field of Classification Search
CPC ...... A45D 24/36; A45D 27/00; A45D 44/005; A45D 2044/007; B26B 19/388;
(Continued)

(56) References Cited

U.S. PATENT DOCUMENTS

| 7,084,386 B2 * | 8/2006 | Bernardini ......... G01B 11/2504 |
| | | 250/208.1 |
| 2010/0186234 A1 * | 7/2010 | Binder .................... A45D 26/00 |
| | | 30/34.05 |

(Continued)

FOREIGN PATENT DOCUMENTS

| WO | 2013096572 A1 | 6/2013 |
| WO | 2013163999 A1 | 11/2013 |

OTHER PUBLICATIONS

Richard O. Duda and Peter E. Hart (Apr. 1971).Use of the Hough Transformation to Detect Lines and Curves in Pictures.

(Continued)

*Primary Examiner* — Loi H Tran

(57) ABSTRACT

The present application relates to a shaving guidance system (10) for guiding a user during a shaving procedure, the system comprising an image sensor (30) configured to register an image of a part of the body of the user, an image data analyzer (41) configured to determine a local hair-growth direction based on data in the image, a controller (40) configured to generate instructions about a direction in (Continued)

which a hair cutting device (20) is to be moved in dependence on the determined local hair-growth direction, and a feedback system (130) configured to provide the instructions to the user.

17 Claims, 6 Drawing Sheets

(51) Int. Cl.
*A45D 44/00* (2006.01)
*B26B 19/38* (2006.01)
*G06T 15/20* (2011.01)
*G06T 7/38* (2017.01)
*G06T 7/73* (2017.01)

(52) U.S. Cl.
CPC .............. *B26B 19/388* (2013.01); *G06T 7/38* (2017.01); *G06T 7/74* (2017.01); *G06T 15/205* (2013.01); *A45D 2044/007* (2013.01); *G06T 2207/10028* (2013.01); *G06T 2207/30201* (2013.01)

(58) Field of Classification Search
CPC ......... G06T 2207/10028; G06T 15/205; G06T 2207/30201; G06T 7/38; G06T 7/74
USPC ......................................................... 348/46
See application file for complete search history.

(56) References Cited

U.S. PATENT DOCUMENTS

| | | |
|---|---|---|
| 2012/0317817 A1 | 12/2012 | Binder |
| 2013/0021460 A1* | 1/2013 | Burdoucci .......... A45D 44/005 348/77 |
| 2013/0250084 A1 | 9/2013 | Binder |
| 2013/0250122 A1 | 9/2013 | Binder |
| 2015/0197016 A1* | 7/2015 | Krenik ................ B26B 19/3806 83/13 |

OTHER PUBLICATIONS http://en.wikipedia.org/wiki/Time-of-flight_camera.
http://pewa.panasonic.com/components/built-in-sensors/3d-image-sensors/.
J. Pagès, J. Salvi, R. García and C. Matabosch. Overview of coded light projection techniques for automatic 3D profiling. IEEE International Conference on Robotics and Automation, ICRA 2003, vol. 1, pp. 133-138, Taipei (Taiwan) Sep. 14-19, 2003.
Noah Snavely, Steven M. Seitz, Richard Szeliski. Photo Tourism: Exploring image collections in 3D. ACM Transactions on Graphics (Proceedings of SIGGRAPH 2006), 2006.

* cited by examiner

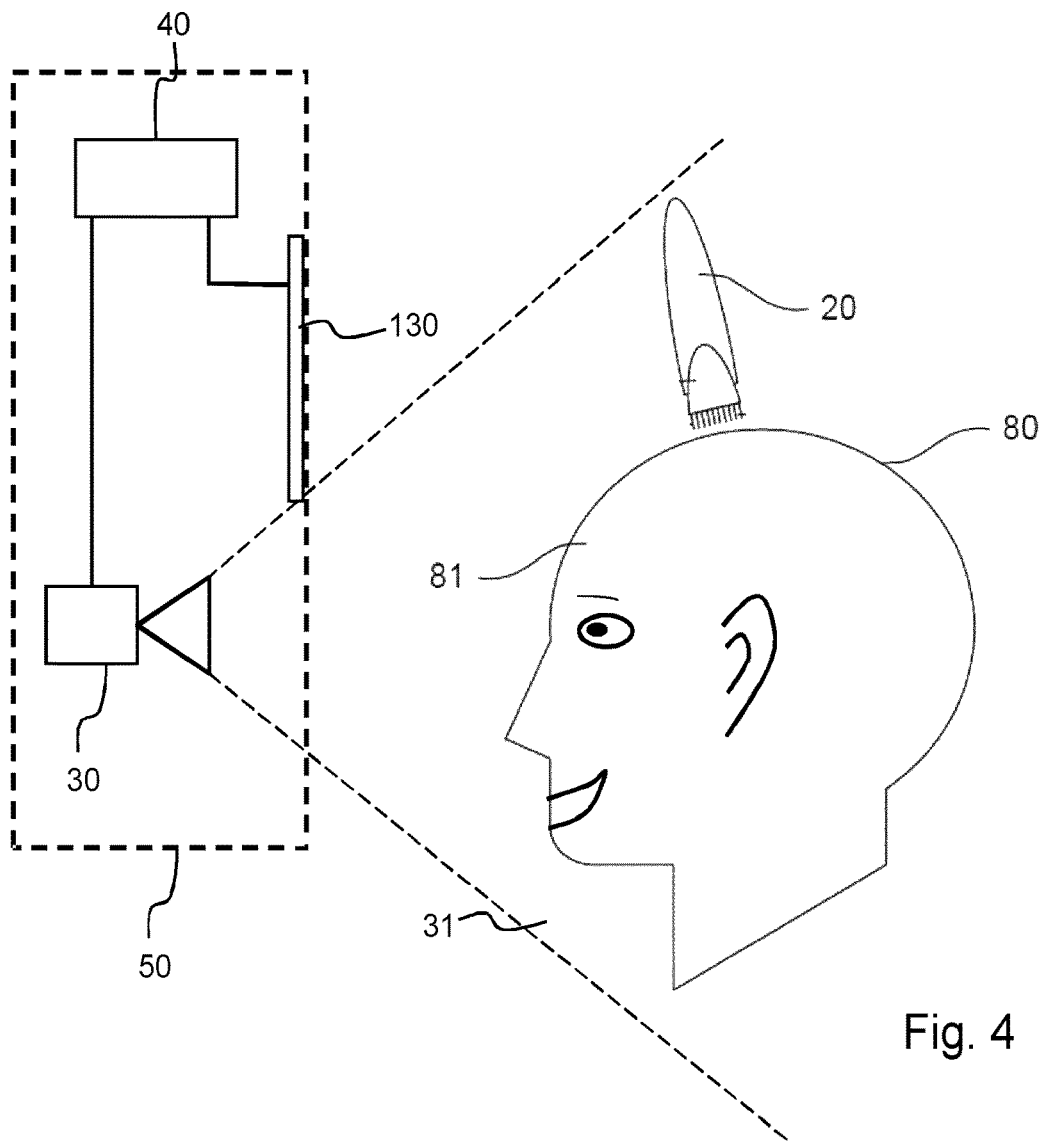

SYSTEM AND A METHOD FOR GUIDING A USER DURING A SHAVING PROCEDURE

This application is the U.S. National Phase application under 35 U.S.C. § 371 of International Application No. PCT/EP2014/072932, filed on Oct. 27, 2014, which claims the benefit of International Application No. 13191733.8 filed on Nov. 6, 2013 and International Application No. 14172936.8 filed on Jun. 18, 2014. These applications are hereby incorporated by reference herein.

FIELD OF THE INVENTION

The present invention relates to a shaving guidance system for guiding a user during a shaving procedure. The present invention also relates to a method of guiding a user during a shaving procedure.

BACKGROUND OF THE INVENTION

Many different types of devices are known for cutting body hair. Hair may be cut using scissors, but to minimize the hair length, other types of devices are used, such as shaving devices and trimmers. In the early days, men used razor blades to shave their beards. Later on electric shaving became popular, also for women. Today, electric hair cutting devices vary from trimmers for trimming facial hair to electric razors for shaving a beard or other body parts.

The usual goal when shaving is to achieve the closest shave possible while minimizing skin irritation. Most facial hair shaving is done by males, but woman may also shave their body or facial hair.

A traditional shave consists of using a razor blade to cut the facial hair. Several techniques have been developed over centuries in this field, making it possible to achieve a close shave without irritation. The main principle is to cut the hair without cutting the skin. This may require several stages in the shaving process. First, the skin hair is conditioned to initiate the shaving process. The goal is to optimize the hair and skin characteristics to achieve an optimal shave. The conditioning may consist of moistening and/or heating the skin/hair. Next, the hair is iteratively cut until a safe against the grain shave can be achieved. This may consist of first cutting the hair in its growth direction, i.e. cutting only the hair without touching the skin. A second stage of shaving is cutting the hair perpendicularly to its growth direction, preparing the hair for the last cutting stage. Finally, in the last stage, the remainder of the hair is cut against its growth direction. At all of these stages, the moistening of the skin is maintained and the blade is kept at a minimal distance from the skin, thus minimizing skin injury.

During the post-shaving routines, the user should close the pores left open after the shaving and minimize any infection possibility from the shaving operation. This is achieved by lowering the face temperature, thereby causing the pores to naturally close and through the application of (chemical) disinfectants, destroying any infection causes which could have resulted from the shaving procedure.

Although the described shaving procedure is very effective to achieve irritation-free close shaving, the procedure is generally regarded as time consuming and difficult, as it requires unique knowledge of the hair growth in each part of the face and a precise application of the shaving sequence. Facial hair grows according to different patterns for different people. While some people present a very uniform top-down hair growth pattern over their face, most people present several variations in this pattern. Differences in patterns can consist of hair growing in different local directions relative to the skin, creating swirls, branches or sinks where the hair converges.

Several interactive hair cutting systems are known to help a user during the cutting of the hair. Publication WO2013/096572 describes a system providing guidance to a user. Information indicative of the position of a hair cutting device relative to the part of the body is generated and used to guide the user. A camera on an electronic computing device may collect images of the user and assess their present hair length and style and determine what styles and lengths are possible with the user's hair. However, the system described in WO2013/096572 cannot determine the hair growth direction for optimizing the shaving result.

So there is a need for a system that provides guidance to a user as to the optimal shaving sequence during the shaving procedure.

SUMMARY OF THE INVENTION

It is an object of the invention to provide a shaving guidance system for guiding a user during the shaving procedure.

According to the present invention, there is provided a shaving guidance system for guiding a user during a shaving procedure, the system comprising an imaging module configured to register an image of a part of the body of the user, an image data analyzer configured to determine a local hair-growth direction based on data in the image, a controller configured to generate instructions about a direction in which a hair cutting device is to be moved over the body in dependence on the determined local hair-growth direction, and a feedback system configured to provide the instructions to the user.

The shaving guidance system according to the invention is able to analyze and to determine the unique hair growth pattern on the user's skin and, based on the determined hair growth pattern, to provide user guidance during the shaving procedure with respect to the optimal shaving sequence. An optimal shaving result requires knowledge of the local hair growth direction, i.e. the hair growth direction as a function of the local position on the user's body, which may be different on different parts of the face or body and may be different for different persons. The image data analyzer will determine the local hair-growth direction, and the user only has to follow the instructions provided by the system in order to obtain an optimal shaving result.

The imaging module may be configured to create a 2D image in which each detected hair is represented by a line in the 2D image. The image data analyzer may be configured to determine the local hair growth direction of hairs using a propagation algorithm which starts determining the hair-growth direction in an initialization region using heuristic information on known hair growth directions, and to determine the hair-growth direction of hairs in a neighboring region next to, or partly overlapping, the initialization region using an orientation of each of the lines representing the hairs and their relative position with respect to the initialization region or region previously processed.

The system may comprise a lighting unit configured to illuminate the part of the body so as to create shadows of the hairs on the skin of the user, wherein in the 2D image each detected hair is represented by a first line representing a hair and a second line representing a shadow of the hair, the image data analyzer being configured to determine the local hair growth direction of hairs using a meeting point of the first and second line. The imaging module may be configured to automatically register a sequence of 2D images, wherein the image data analyzer is configured to create a 3D image of the part of the body using the sequence of 2D images, the image data analyzer further being configured to determine the local hair growth direction by analyzing the 3D image.

In an embodiment, the imaging module is configured to create a 3D image in which each detected hair is represented by a 3D line. The image data analyzer may then further being configured to determine the local hair growth direction by analyzing the 3D image.

In an embodiment of the shaving guidance system according to the invention, the controller is configured to determine a preferred sequence of movements to be followed by the user based on the determined local hair-growth direction, wherein the instructions relate to steps within the preferred sequence of movements. In this embodiment, the user may receive a recipe with information about the direction in which the hair cutting device is to be moved during the whole shaving process.

In an embodiment of the shaving guidance system according to the invention, the controller is configured to determine the local hair growth direction using heuristic information about known hair growth directions at certain positions on the body of the user. For example, when using an optical registration technique to determine the local hair growth direction from the image, the registered image may just indicate the orientation of the hairs but not the actual growth direction of the hairs. Heuristic information about known hair growth directions at certain positions on the face or body will in that case improve the determination by the controller of the direction of the hair growth using the registered picture. For example, side burns and moustache typically grow in a downward direction relative to the face.

In an embodiment of the shaving guidance system according to the invention, the system comprises a position identifier configured to generate position information indicative of a position of the hair cutting device relative to the part of the body. The position information can be used by the controller to enable real-time guidance of the user. The controller may be configured to monitor a trajectory of the hair cutting device using the position information. This enables the controller to store and use a tracking history, which may be used to generate instructions that are preferred for different phases of the shaving procedure. For example, the user may be instructed to move a blade shaver over the skin surface in the hair growth direction during a first phase, and in a direction opposite to the hair growth direction ("against the grain") in a second phase, and possibly perpendicularly to the hair growth direction between the first and second phases.

In a further embodiment of the shaving guidance system according to the invention, the controller is configured to operate the feedback system to provide an indication to the user of a desired path and/or angle of orientation of the hair cutting device based on the position information. This will provide the user with very user-friendly feedback, which indicates not only the preferred direction of movement in a momentary position of the hair cutting device, but also preferred directions in subsequent positions, which will enable the user to correctly follow the instructions even when he moves the hair cutting device at relatively high speed. Presenting a preferred angle of orientation will help the user to optimize the shave in regions of the face or body where the orientation is important for an optimal shave.

In a further embodiment of the shaving guidance system according to the invention, the feedback system comprises a display module configured to display a representation of the part of the body and visual signs representing the instructions. This will provide the user with very user-friendly feedback, enabling the user to easily understand the instructions in relation to the part of the face or body to be treated.

Alternatively or additionally, the feedback system may comprise an audio module configured to produce the instructions in an audio format. Audio instructions may help for example visually challenged people during shaving.

Alternatively or additionally, the feedback system may comprise a haptic module configured to produce the instructions in a haptic format. This haptic feedback may be created by a vibrating module in the hair cutting device itself, so as to guide the user.

In an embodiment of the shaving guidance system according to the invention, the shaving guidance system is a hybrid shaving guidance system which comprises a base unit and a hair cutting device. The base unit and the hair cutting device may be configured to exchange information and/or instructions using wired or wireless communication means.

In an embodiment of the hybrid shaving guidance system according to the invention, the base unit comprises the image sensor and the controller, and the hair cutting device comprises the feedback system. In an alternative embodiment of the hybrid shaving guidance system according to the invention, the base unit comprises the feedback system, and the hair cutting device comprises the image sensor and the controller.

In a further embodiment of the hybrid shaving guidance system according to the invention, the base unit is embodied by a computing device, such as a tablet, or by a mobile telecommunication device, such as a smartphone.

In an embodiment the whole shaving guidance system is embodied by a computing device, a mobile telecommunication device or a hand-held electrical hair cutting device. In case of a computing device or a mobile telecommunication device the user is provided with a shaving guidance device that will guide the user without the need for an adapted hair cutting device.

In case of the system being a hand-held electrical hair cutting device, the user may be guided by the hair cutting device itself without the need for any additional base unit, such as an adapted computing device or a mobile telecommunication device.

According to a further aspect of the invention, there is provided a method of guiding a user during a shaving procedure, the method comprising making an image of a part of the body of the user, determining a local hair-growth direction on the body of the user using the image, generating instructions about a direction in which a hair cutting device is to be moved over the body in dependence on the determined local hair-growth direction, and providing the instructions to the user.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which:

FIG. 4 schematically shows a smartphone acting as a shaving guidance device according to an embodiment of the present invention;

FIG. 5 schematically shows a hair cutting device acting as a shaving guidance device according to an embodiment of the present invention, FIG. 6 schematically shows a side, facing the user's skin, of the hair cutting device of FIG. 5.

DETAILED DESCRIPTION OF EMBODIMENTS

Figure 1:
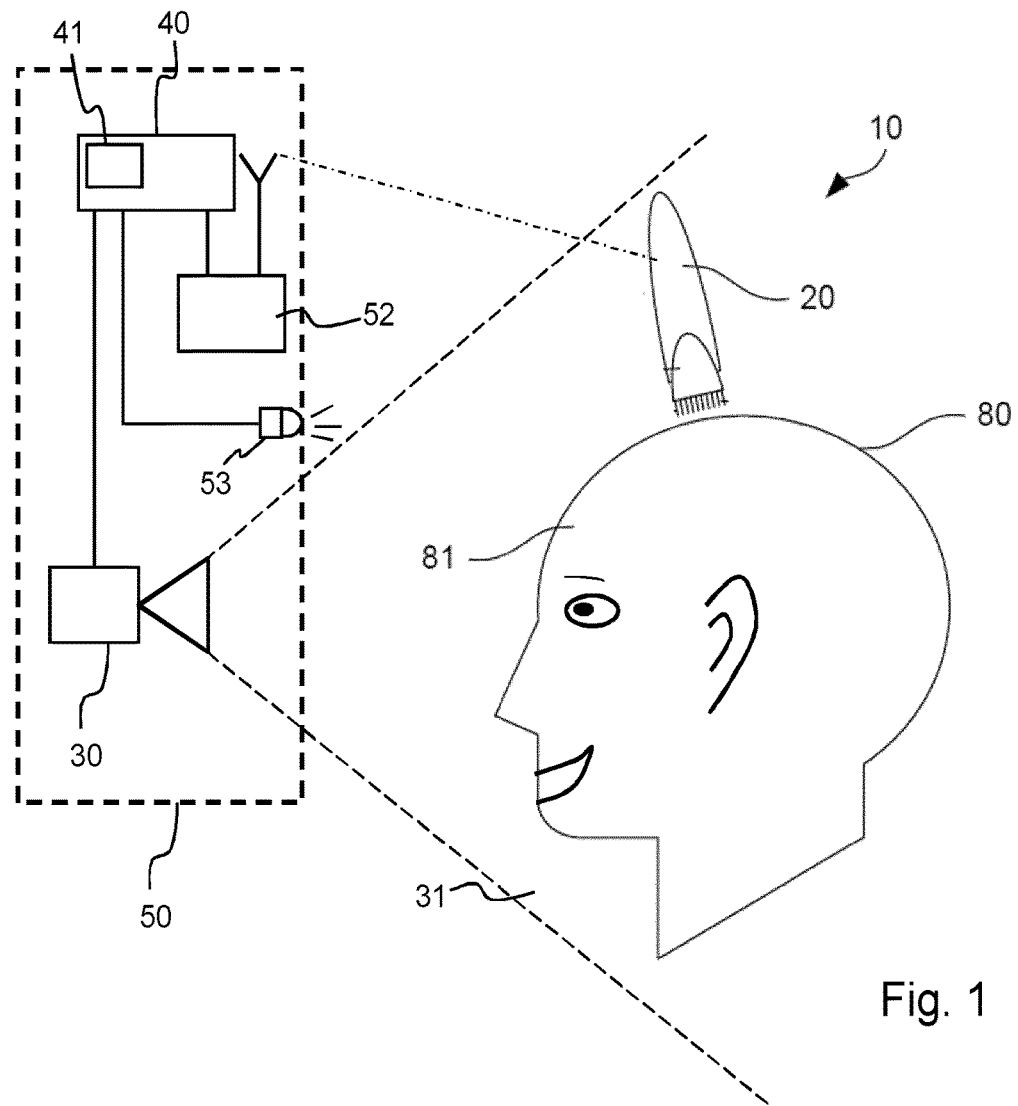
FIG. 1 shows a schematic view of a shaving guidance system according to an embodiment of the invention.

FIG. 1 shows a schematic view of a shaving guidance system 10 according to an embodiment of the invention. The system 10 comprises a base unit 50 and a hair cutting device 20. The base unit 50 comprises an image sensor 30 and a controller 40. In this embodiment the base unit further comprises a communication module 52 for wireless communication with the hair cutting device 20, and lighting unit 53 configured to illuminate the part of the body so as to create shadows of the hairs on the skin of the user.

The base unit 50 may be a tablet, laptop, personal computer or any other suitable computing device. Alternatively, the base unit 50 may be a smartphone, phablet or any other type of mobile telecommunication device, such as a Google glass. The image sensor 30 is configured to register an image of a part 81 of the body of the user 80. In the example of FIG. 1, the image sensor 30 will register a face 81 of the user 80. The controller 40 may comprise an image data analyzer 41 configured to determine a local hair-growth direction based on data in the image. It is noted that the image data analyzer 41 may be a software program loaded on or by the controller 40, or it may be separate from the controller 40 being a separate hardware component in communication with the controller 40. The image data analyzer 41 may determine the local hair growth direction on the user's face 81 using different image processing methods, as will be explained in more detail below with reference to FIGS. 7-9.

Figure 2:
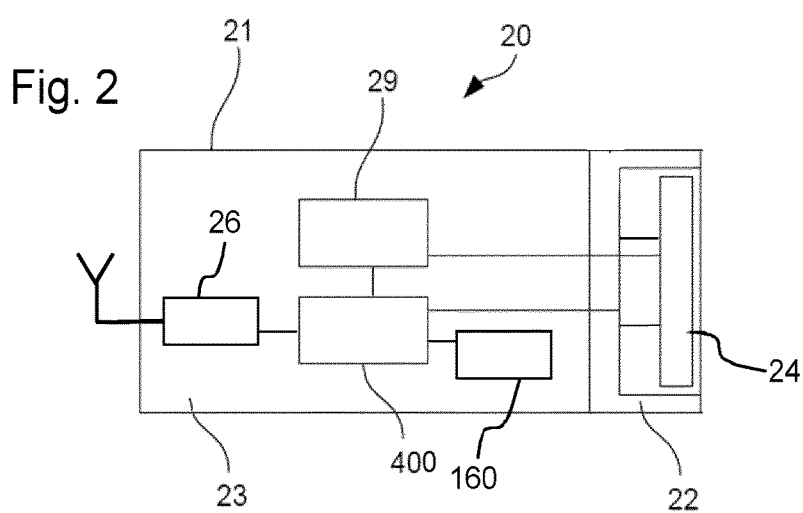
FIG. 2 schematically shows an example of a hair cutting device of the shaving guidance system according to the embodiment of FIG. 1.

FIG. 2 schematically shows an example of the hair cutting device 20 according to the embodiment of FIG. 1. The hair cutting device 20 may be a hand-held electrical shaving device. However, it will be apparent that the hair cutting device 20 may have an alternative arrangement. For example, the hair cutting device 20 may be a hand-held electrical hair trimming device. Alternatively, the hair cutting device 20 may be a hair removal device for epilation (hair extraction).

The hair cutting device 20 may be moved over a part of a user's body, for example the face 81 to shave a beard. The hair cutting device 20 comprises a main body 21 and a cutting head 22 at one end of the main body 21. The main body 21 defines a handle portion 23. The body 21 and the cutting head 22 are arranged so that the handle portion 23 can be held by a user. The cutting head 22 has a cutting unit 24. The cutting unit 24 is configured to shave the hair. The cutting unit 24 is driven by a driver 29. The driver 29 acts to drive the cutting unit 24 in a driving action. In the present embodiment, the driver 29 is an electric motor.

The hair cutting device 20 further comprises a controller 400, a haptic feedback system 160, and a communication module 26 for wireless communication with the communication module 52 of the base unit 50. The controller 400 is configured to control the driver 29, the communication module 26 and the haptic feedback system 160.

In the embodiment of FIG. 1, the image sensor 30 on the base unit 50 acts as a means to register an image of the part 81 of the body of the user 80. Alternatively or additionally, the image sensor 30 may act as a position identifier configured to generate information indicative of the position of the hair cutting device 20 relative to the part of the body to be treated. That is, a position identifier is capable of generating information indicative of the position of the hair cutting device 20 relative to the registered part 81 of the body. It will be understood that alternative means or complimentary means of generating information indicative of the position of the hair cutting device 20 may be used. Examples of such a position identifier include electromagnetic field detection systems, microwave detection systems, inertial measurement systems, and/or ultrasonic detection systems.

In the above described embodiment, the image sensor 30 and the controller 40 form part of the base unit 50, e.g. a tablet 50. Alternatively, the image sensor 30 and controller 40 are disposed separately. In one embodiment, the controller 40 in the hair cutting device 20 is configured to determine the local hair growth direction on the user's body using the image generated by the image sensor 30, and to generate instructions about a direction in which the hair cutting device 20 is to be moved in dependence on the determined local hair-growth direction.

The image sensor 30, the controller 40 and the hair cutting device 20 communicate with each other. In the present embodiment, the image sensor 30 and the controller 40 communicate via a wired connection. The controller 40 and the hair cutting device 20 communicate via a wireless connection. Alternative arrangements are envisaged. For example, the controller 40 and hair cutting device 20 may be connected by a wired connection, and/or the controller 40 and the image sensor 30 may be connected by a wireless connection. Wireless modules, for example radio or infrared transmitters and receivers, serve to wirelessly interconnect the different components. It will be understood that WiFi™ and Bluetooth™ technologies may be used.

The image sensor 30, acting as an imaging module, may be a depth or range image sensor. That is, the image sensor 30 uses range imaging to determine the position of elements within the field-of-view or within the optical sensing zone 31 of the image sensor 30 (see FIG. 1). The image sensor 30 may produce a two-dimensional image with a value for the distance of elements within the optical sensing zone 31 from a specific position, such as the image sensor itself. In the present embodiment, the image sensor 30 is configured to employ a structured light technique to determine the position, including the distance, of elements within the optical sensing zone 31 of the image sensor 30. Such a technique illuminates the field of view with a specially designed light pattern. An advantage of this embodiment is that the depth may be determined at any given time using only a single image of the reflected light. Alternatively, the image sensor 30 is configured to employ a time-of-flight technique to determine the position, including the distance, of elements within the field of view of the image sensor 30. An advantage of this embodiment is that the number of moving parts is minimized. Other techniques include echo-graphic technologies, stereo triangulation, sheet of light triangulation, interferometry, and coded aperture.

The image sensor 30 may be a digital camera capable of generating image data representing a scene received by the camera's sensor. The image data can be used to capture a succession of frames as video data. The optical sensing zone 31 is the field-of-view within which optical waves reflecting from or emitted by objects are detected by the image sensor. The image sensor 30 may detect light in the visible part of the spectrum, but it can also be an infra-red image sensor.

The image sensor 30, acting as the imaging module, may be configured to generate information indicative of the position of elements within the optical sensing zone 31. The image sensor 30 generates the information based on the image data generated by the image sensor. The image sensor 30, acting as the imaging module, may generate a visual image with depth, for example an RGB-D map. The image sensor 30 may generate a visual image with depth map of the elements within the optical sensing zone 31 of the image sensor 30. Alternative means of generating information indicative of the position of elements within the optical sensing zone 31 are anticipated. For example, the image sensor 30 may generate a depth image (D-map) of the elements within the optical sensing zone 31.

The image sensor 30 may be configured to generate a visual image with depth map with 30 frames per minute. Furthermore, the image sensor 30 may have a resolution of 640×480. The depth range may range from 0.4 m to 1.5 m. The angle of the field-of-view may lie between 40 degrees and 50 degrees. This provides a suitable area for a user to be positioned within the optical sensing zone 31. The depth resolution may be configured to be about 1.5 mm within the optical sensing zone 31.

Whilst the above parameters have been found to be sufficient for accurate determination of position for cutting hair, it will be understood that alternative parameters may be used. For example, a filter (not shown) may be used to enhance accuracy of the available resolution.

In an embodiment, the system can adapt to the specific shaver used. In case of electric shavers cutting in a unique hair direction, the model can be automatically detected by the controller 40 if the model is equipped with a visible light communication system, which is detected by the image sensor 30 used to recognize the user's face.

Figure 3:
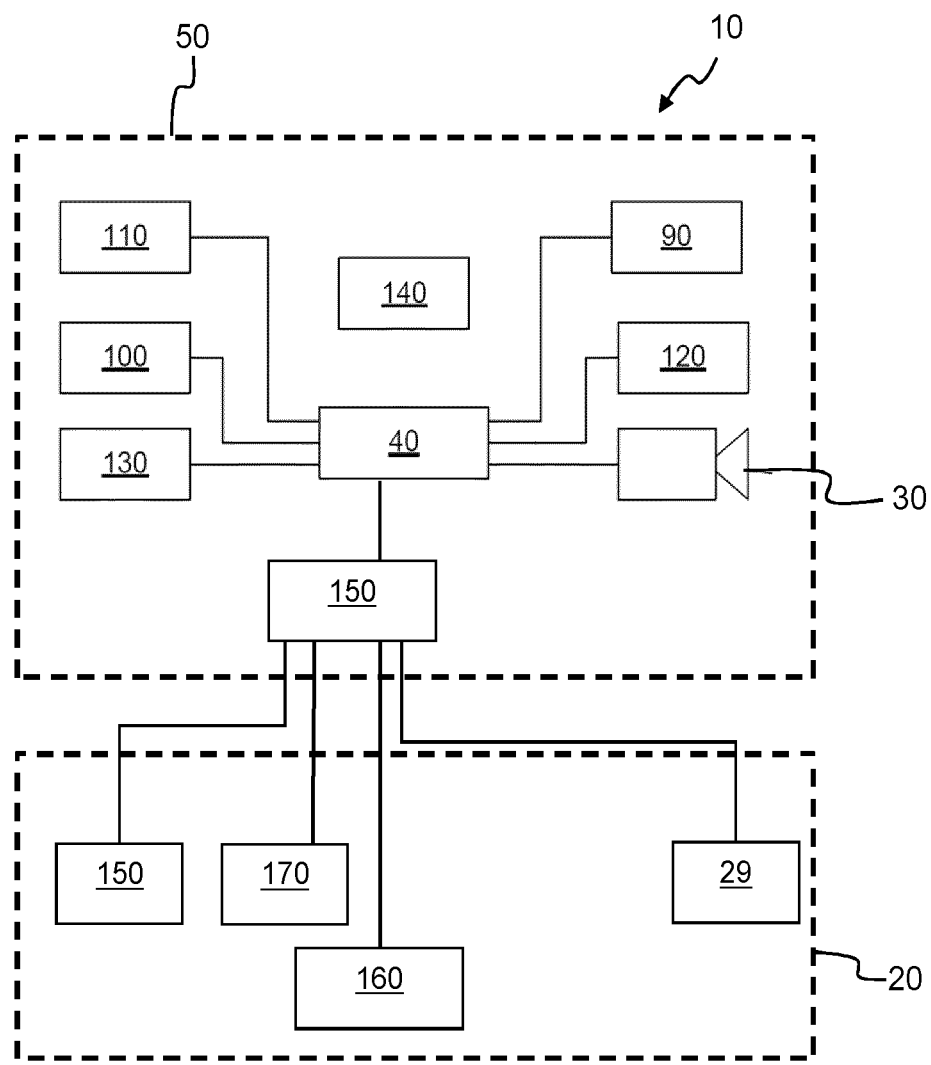
FIG. 3 schematically shows a further embodiment of a shaving guidance system according to the invention.

FIG. 3 schematically shows a further embodiment of the system 10. The system 10 comprises the base unit 50 and the hair cutting device 20 communicating with each other via a wired connection. The base unit 50 comprises the image sensor 30 and the controller 40. The base unit 10 also comprises a user input 90, a non-volatile memory 100, a RAM 110, a speaker 120, a display 130 and a power supply 140. The hair cutting device 20 in this embodiment comprises the driver 29, an inertial measurement unit (IMU) 150, and a vibration motor 160 acting as the haptic feedback system 160.

The memory 100 may be a non-volatile memory such as a read only memory (ROM), a hard disk drive (HDD) or a solid state drive (SSD). The non-volatile memory 100 stores, amongst other things, an operating system. The non-volatile memory 100 may be disposed remotely. The controller 40 may be able to refer to one or more objects, such as one or more profiles, stored by the memory 100 and upload the one or more stored objects to the RAM 110.

The RAM 110 is used by the controller 40 for temporary storage of data. The operating system may contain a code which, when executed by the controller 40 in conjunction with the RAM 110, controls the operation of each of the hardware components of the system 10. The controller 40 may be able to cause one or more objects, such as one or more profiles, to be stored remotely or locally by the non-volatile memory 100 and/or to the RAM 110.

The power supply 140 may be a battery configured to supply power to both the base unit 50 and the hair cutting device 20. It is noted that the hair cutting device 20 may have a separate power supply unit (not shown). In the present embodiments, the power supply unit is a built-in rechargeable battery, however it will be understood that alternative power supply means are possible, for example a power cord that connects the system 10 to an external electricity source.

The controller 40 may take any suitable form. For instance, the controller 40 may be a microcontroller, a plurality of controllers, a processor, or a plurality of processors. The controller 40 may be formed of one or multiple modules.

In the present embodiment, the speaker 120 is disposed in the base unit 50. Alternatively, the speaker 120 may be on the hair cutting device 20 or disposed separately therefrom. In such an arrangement, the speaker 120 will be disposed close to a user's head to enable audible signals generated by the speaker 120 to be easily heard by a user. The speaker 120 is operable in response to signals from the controller 40 to provide audible signals to the user. It will be understood that in some embodiments the speaker 120 may be omitted.

In the present embodiment, the display 130 is disposed in the base unit 50 acting as a feedback system. Alternatively, the display 130 may be disposed on the hair cutting device 20 or disposed separately therefrom. The display 130 is operable in response to signals from the controller 40 to produce visual indicators or signals to provide guiding instructions to the user. It will be understood that in some embodiments the display 130 may be omitted.

The feedback system may also include the vibration motor 160, for example to provide tactile feedback to the user. The vibration motor 160, or another tactile feedback means, is disposed in the cutting unit 20.

The user input 90 in the present embodiment includes one or more hardware keys (not shown), such as a button or a switch. The user input 90 is disposed on the base unit 50, although it will be understood that the user input 90 may be on the hair cutting device 20, or a combination thereof. The user input 90 is operable, for example, to enable a user to select an operational mode, to activate the system 10 and/or to deactivate the system 10.

The inertial measurement unit 150 is in the hair cutting device 20. In the present arrangement, the IMU 150 is accommodated in the main body 21 of the hair cutting device 20. IMUs are known and so a detailed description will be omitted herein. The IMU 150 is configured to provide the readings of six axes of relative motion (translation and rotation). The IMU 150 is configured to generate information indicative of the position of the hair cutting device 20. The information generated by the IMU 150 is provided to the controller 40.

Although in the present and other described embodiments the position identifier is an imaging module, it will be understood that alternative means or complimentary means of generating information indicative of the position of the part 81 of the body to be treated and the hair cutting device 20 may be used. Examples of such a position identifier include electromagnetic field detection, microwave detection, inertial measurement, and/or ultrasonic detection. A detailed description of the alternative arrangements has been omitted. The image sensor 30, acting as a position identifier, may be omitted and the IMU 150 may be used to generate information indicative of the position of the hair cutting device 20. With such an arrangement, information indicative of the position of the hair cutting device 20 generated by the IMU 150 is provided to the controller 40 and/or referred to by the controller 40.

Instead of providing position information, the IMU 150 could also be used to generate information indicative of the motion of the hair cutting device 20. The registered motion can be used to give corrective instructions to the user. The controller 40 could instruct the user to adjust the direction of movement of the hair cutting device 20 to obtain desired movement of the device relative to the determined growth direction. So, in this case, there is no need for information on the exact location of the hair cutting device 20.

In alternative embodiments, the position identifier has or includes an alternative means to generate information indicative of the position of one or more objects, in particular a part of a body to be treated and the hair cutting device 20. Such alternative means may be used instead of or in combination with either an imaging module or an IMU, or both. For example, the position identifier may be configured to generate information indicative of the position of the hair cutting device 20 based on acoustic detection, ultrasonic detection, infrared signals, detection of signal propagation time and/or angles, and/or another technique for analyzing signals may be used.

Hair cutting device 20 may include one or more accelerometers, gyroscope or other position and/or orientation monitoring sensors to determine the position and/or orientation of the hair cutting device 20.

In one embodiment, the position identifier is configured to generate information indicative of the position of the treating device 20 based on electromagnetic field detection. In such an embodiment, the position identifier comprises one or more electromagnetic field detectors (not shown). The one or more electromagnetic field detectors are configured to detect changes in an electromagnetic field to generate information indicative of the position of the treating device relative to the part of the body to be treated based on a detected electromagnetic field.

In one embodiment one or more position indicators (not shown) which are detectable by the position identifier may be mounted to a part of the body, such as the part of the body to be treated. Such position indicators may be inactive or they may be active, in which latter case they, for example, transmit a signal to be detected by the position identifier. Such signals may include electro-magnetic signals, acoustic signals, ultrasonic signals, infrared signals, visual signals, and/or optical signals.

The position identifier may be mounted to the part of the body to be treated, generate information indicative of the position of the part of the body to be treated and/or the hair cutting device, based on signals received from another part of the system, for example the hair cutting device 20. The position identifier may be on the hair cutting device 20. Any combination of the above described means for generating information indicative of the position of the hair cutting device 20 relative to the part of the body to be treated is also conceivable.

The system 10 of FIG. 1 may be operated by disposing the base unit 50 in a suitable location for cutting hair. That is, the base unit 50 is positioned so that the user is able to position the part of the body to be treated, for example the head, within the optical sensing zone 31. For example, the image sensor 30 is disposed approximately at the same height as where a user's head will be positioned during operation of the system 10. In an embodiment in which the image sensor 30 is separate from the base unit 50, or in which the base unit 50 is omitted, the image sensor 30 is positioned as necessary. The hand-held hair cutting device 20 is held by the user.

The image sensor 30 configured to register an image of a part of the body of the user, the controller 40 configured to determine a local hair-growth direction using the image, and the feedback system may all be comprised in a single device, such as a computer device or a telecommunication device. FIG. 4 schematically shows a smartphone 50 acting as a shaving guidance device according to an embodiment of the present invention. The smartphone 50 comprises a display 130 acting as a feedback system configured to give instructions to the user about a direction in which the hair cutting device 20 is to be moved in dependence on the determined local hair-growth direction. The image sensor 30 acquires an image of the face 81 and the controller 40 determines the local beard growth direction using image processing means. The local beard growth direction may be translated into a personalized shaving recipe comprising instructions relating to steps of a preferred sequence of movements.

The hair growth direction pattern may be determined using local kernels (i.e. scanning windows) on which a line detection routine is used. An example of such a routine is the Hough transform. By applying a Hough filter over the body part to be shaved, a map providing the hair orientation may be obtained. The hair growth directions can e.g. be determined using heuristics on known hair growth directions at certain positions on the face and common hair direction propagation factors. For example, side burns and moustache typically grow in a downwards direction relative to the face, which can be used as initialization points. A kernel is iteratively moved along the initialization direction in the orientation previously detected. Different sizes can be assigned to the kernel depending on the size of the target blade to be used for the sequence. The parts not covered by the filter movement may be interpolated to their nearest values.

The smartphone 50 may give shaving advice on its display 130 by showing a personalized instruction movie or augmenting the image with graphical information showing the optimal shaving pattern. This could be a static procedure. The smartphone 50 could also track the shaving process by monitoring a trajectory of the hair cutting device 20 and provide the next instructions to the user 80. Furthermore, the trajectory could be used also to indicate that the user 80 should change the manipulation speed of the hair cutting device 20.

It is noted that instead of a suitably programmed smartphone, another type of telecommunication device could be used such as a phablet. Furthermore, the shaving guidance device could be embodied by a suitably programmed computer device, such as a laptop, notebook or a personal computer.

Figure 6:
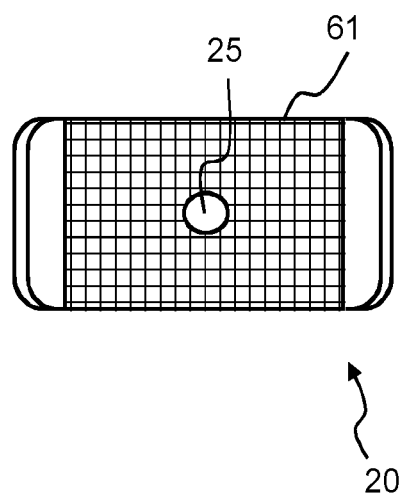

FIG. 5 schematically shows a hair cutting device 20 acting as a shaving guidance system according to an embodiment of the present invention. The hair cutting device 20 comprises the controller 40, the driver 29 and the haptic feedback system 160. The hair cutting device 20 also comprises an image sensor 25 which is arranged on a side of the hair cutting device 20 facing the user's skin during normal use of the device. FIG. 6 schematically shows the side of the hair cutting device 20 facing the user's skin during normal use of the device 20. In this example, the image sensor 25 is arranged in a recessed part of a shaving foil 61. This will enable registration of the part of the body currently treated by the hair cutting device 20. It is noted that the image sensor 25 may be arranged at other locations on the hair cutting device 20.

Figure 7:
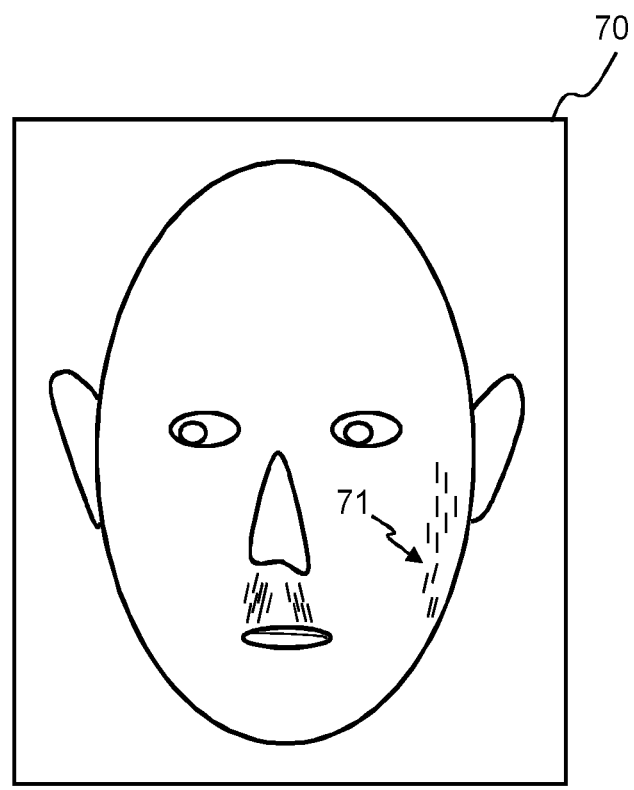
FIG. 7 shows an example of a 2D image created by an image sensor, in which each detected hair is represented by a line in the 2D image.
Figure 8:
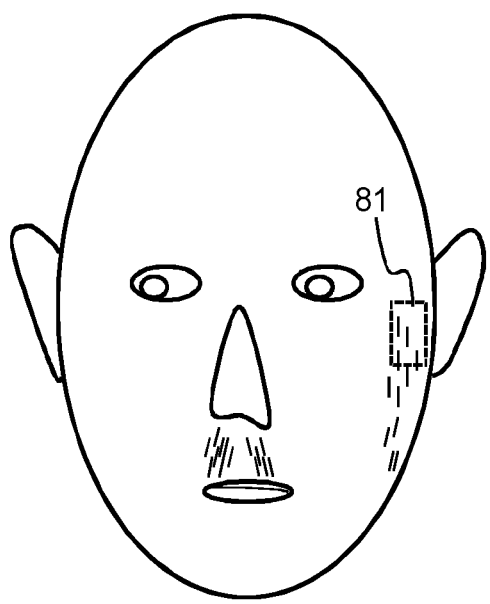
FIG. 8 shows the face in the image of FIG. 7 together with an initialization region where the direction of the hairs is determined using heuristics.
Figure 9:
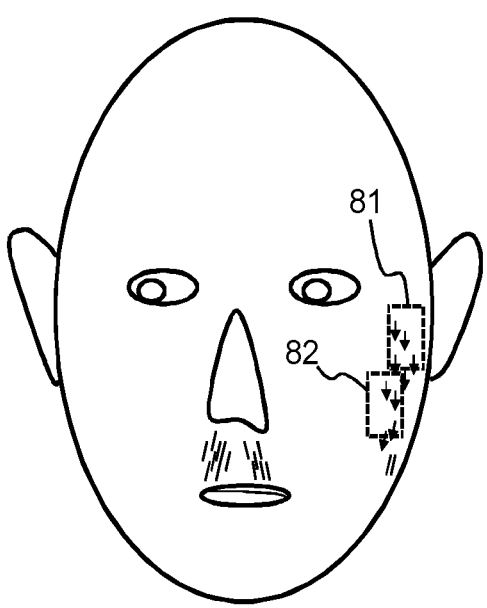
FIG. 9 shows the face of FIG. 8 together with the initialization region and a neighboring image region to be processed.

The imaging module 30 may be an image sensor 30 configured to create a 2D image in which each detected hair is represented by a line in the 2D image. An example of such a 2D image is shown in FIG. 7, see image 70. The image can be a black and white image comprising a part of the body, such as the face. On the face, hair are detected and represented by lines 71. In this example only some of the detected hairs 71 are shown for simplicity. The image data analyzer 41 may be configured to determine the local hair growth direction of hairs using a propagation algorithm which starts determining the hair-growth direction in an initialization region, see square 81 in FIG. 8 which shows the face of FIG. 7. Heuristic information on known hair growth directions is used to determine the hair-growth direction in this initialization region 81. An example of heuristic information may be that hairs on the side burns of men grow downwards. This means that lines in region 81 can be converted by the image analyzer 41 into arrows pointing down, see FIG. 9 which shows the face of FIG. 8. Once the initialization region 81 has been converted, lines in a neighboring region 82 next to, or partly overlapping, the initialization region 81 are converted into arrows using an orientation of each of the lines representing the hairs in the neighboring region and their relative position with respect to the initialization region 81 or region previously processed. The result of such a next step is shown in FIG. 9.

Figure 10:
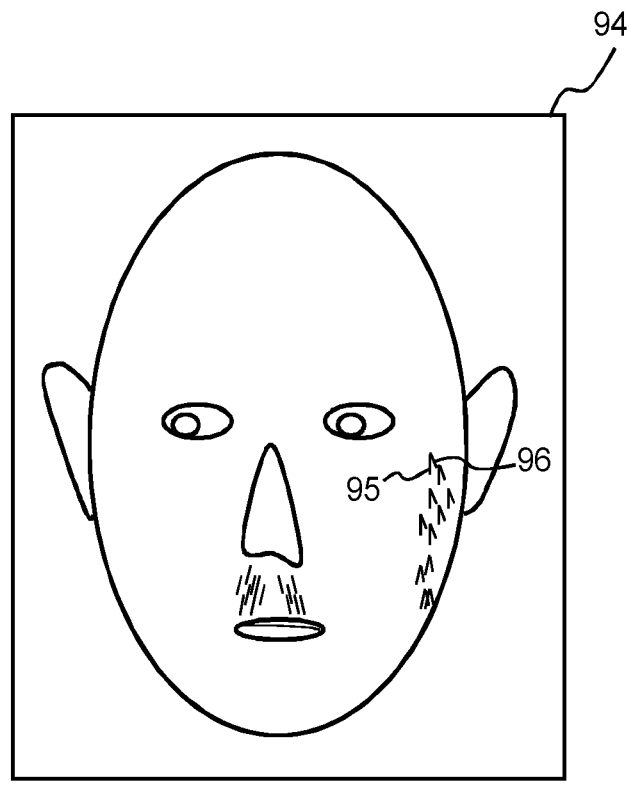
FIG. 10 shows an example of an image with lines representing the hairs on a side burn and lines representing shadows of the hairs.
Figure 11:
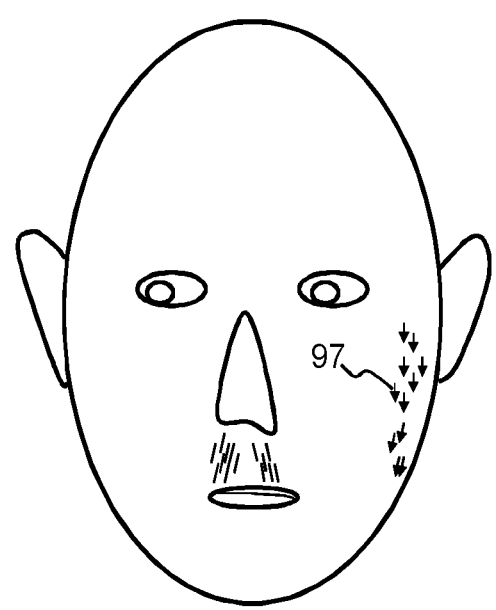
FIG. 11 shows the face of FIG. 10 in which the image data analyzer has determined the local hair growth direction of some of the hairs using a meeting point of the first and second lines.

In an embodiment the system comprises a lighting unit 53, see also FIG. 1, configured to illuminate the part of the body so as to create shadows of the hairs on the skin of the user, wherein in the 2D image each detected hair is represented by a first line representing a hair and a second line representing a shadow of the hair. FIG. 10 shows an example of an image 94 with lines 95 representing the hairs on a side burn and lines 96 representing shadows of the hairs. FIG. 11 shows the face of FIG. 10 in which the image data analyzer 41 has determined the local hair growth direction of some of the hairs using a meeting point of the first and second lines. It is noted that the image data analyzer 41 may determine the meeting points of the hairs and the associated shadows for the whole picture at once, or alternatively, the image data analyzer 41 may use a propagation algorithm to improve the results, since not all regions can be processed by only looking at the shadows, since some regions may not have shadows, see for example the moustache in FIGS. 10 and 11, because of non-optimal positioning of the lighting unit 53 relative to the detected hairs. Here it is noted that the lighting unit 53 may be arranged on the base unit 50 and/or on the cutting device 20 itself, depending on the application and detection algorithms used.

In an embodiment the imaging module 30 is configured to automatically register a sequence of 2D images, wherein the image data analyzer 41 is configured to create a 3D image of the part of the body using the sequence of 2D images. The image data analyzer 41 will then determine the local hair growth direction by analyzing the 3D image.

The imaging module 30 may alternatively be configured to create a 3D image in which each detected hair is represented by a 3D line. The image data analyzer 41 will then determine the local hair growth direction by analyzing the 3D image, and converting the 3D image into e.g. a map with arrows indicating a hair growth direction.

The above mentioned determined hair-growth direction may be used to create instructions for the user. For example, in the case of shaving a beard, if the growth direction is downwards, the instructions for that part of the face may be to follow the growth direction in a first phase (audio or visual instruction may be: "move shaver downwards") while moving the shaver in an opposite direction in an following phase so as to improve the shaving result.

In an embodiment the hair cutting device 20 is configured to enable tracking its position with respect to the user's face. The embedded image sensor 25 determines the local hair-growth direction using image processing means. The location of the hair cutting device and the local hair growth direction are translated into personalized shaving instructions. The hair cutting device 20 may instruct the user by means of a display (not shown), the haptic feedback system 160, an audio signal or another way of user interaction. It is noted that the movement of the device 20 could be reconstructed with an accelerometer, and that the shaving guidance device could also indicate that the user should change the manipulation of the hair cutting device 20.

When using a conventional hair cutting device, the user will determine the shaving trajectory on the basis of experience and common sense. However, many users are not aware of the possibility to improve the shaving result and experience. By automatically determining the local hair growth direction and using the determined local hair growth directions to provide the user with instructions for optimal shaving guidance, the above described system and/or device will enable the user to improve the shaving result and reduce the necessary shaving time.

In an embodiment, the system 10 is operable to provide information indicative of the path and/or angle of orientation of the hair cutting device relative to the part of the body to be treated, and to operate a feedback module to provide feedback to a user based on the path and/or angle of orientation of the treating device determined by the controller 40. The controller 40 may be configured to determine the path of the hair cutting device 20 based on position information generated by the image sensor 30 acting as a position identifier. In particular, the controller 40 may be configured to determine the path of the hair cutting device 20 relative to the part of the body to be treated by monitoring the information generated by the image sensor 30 and determining the change in position of the hair cutting device 20 relative to the part of the body to be treated based on the determined change in position of the hair cutting device 20 relative to the part of the body to be treated over a predetermined time period. The controller 40 may also, or alternatively, determine the angle of orientation of the hair cutting device 20 relative to the part of the body to be treated. Alternatively, or in combination therewith, the image sensor 30 may be configured to calculate the absolute angle of orientation of the hair cutting device 20 relative to the part of the body to be treated based on the orientation of features of the main body 21 and/or cutting head 22 of the hair cutting device 20. With such an arrangement it is possible to determine the angle of orientation without detecting any movement of the hair cutting device 20 relative to the part of the body to be treated.

Although in the above embodiment the image of the part of the body corresponds to the image of the part of the body to be treated, it will be understood that the invention is not limited thereto. For example, the image sensor 30 may generate image data including data representative of a lower part of a user's head, and the system 10 may extrapolate this data to generate information indicative of the upper part of a user's head.

In an embodiment, when the image sensor 30 is unable to provide information indicative of the position of the hair cutting device 20, or indicates that the hair cutting device 20 is not found within the image data representing a scene received by the image sensor's sensor within the optical sensing zone 21, the controller 40 is configured to refer to information indicative of the position of the hair cutting device 20 provided by the IMU 150. The IMU 150 is disposed in the hair cutting device 20 and may be operable throughout the operation of the system 10, or only when it is operated by the controller 40, for example when the image sensor 30 is unable to detect the hair cutting device 20 that is outside the optical sensing zone 31 of the image sensor 30.

The IMU 150 is configured to generate information indicative of the position of the hair cutting device 20 based on the IMU's own position in the hair cutting device 20. The IMU 150 provides readings of 6 axes of relative motion translation and rotation. The IMU 150 is configured to generate information indicative of the path of the hair cutting device 20 relative to the part of the body to be treated. Furthermore, the IMU 150 is also, or alternatively, configured to generate information indicative of the angle of orientation of the hair cutting device 20 relative to the part of the body to be treated. The controller 40 may be configured to calibrate the IMU 150 based on information generated by the image sensor 30 when the hair cutting device 20 is within the optical sensing zone 31. This helps to remove positioning errors due to the readings of the IMU 150 over time.

Although in the present embodiment the controller 40 is configured to refer to information generated by the IMU 150 when the treating device is outside an optical sensing zone of the imaging module, it will be understood that the controller 40 may be configured to refer to information generated by the imaging module and the inertial navigation system module throughout the use of the system 10. In an alternative embodiment, the IMU 150 may be omitted. In such an embodiment, information indicative of the position, path and/or angle of orientation of the hair cutting device 20 relative to the part 81 of the body to be treated may be determined by extrapolation of the image data representing a scene received by the image sensor's sensor within the optical sensing zone 21. Alternatively, the controller 40 may be configured to provide feedback to a user, for example by means of audio signals, to guide the user to change their gaze direction relative to the image sensor 30 so that the hair cutting device 20 is within the optical sensing zone 31, and the image sensor 30 is able to generate image data representing a scene received by the image sensor's sensor within the optical sensing zone 21.

When information is provided indicative of the position of the part of the body to be treated, in this case the user's head, and indicative of the hair cutting device 20, it is possible to determine the position, path and/or angle of orientation of the hair cutting device 20 relative to the part of the body to be treated based on the image of the part of the body and the hair cutting device 20. The relative positions may be calculated based on vector subtraction. Therefore, the relative positions may be easily determined.

The controller 40 may be configured to refer to a reference profile of the part of the body to be treated. The reference profile may be stored in a look-up table. The reference profile may be stored by the memory 100. In such an arrangement, the controller 40 is configured to refer to the memory 100 to access the reference profile. In one embodiment, the reference profile is stored by the RAM 110. The reference profile provides information of the part of the body to be treated. The reference profile may also provide information of a desired path and/or angle of orientation of the hair cutting device 20. The reference profile may be communicated and stored with reference to a coordinate system. In one such configuration use is made of a polar coordinate system in which each position on the part of the body to be treated is determined by a distance from a fixed point and an angle from a fixed direction. Another configuration uses a Cartesian coordinate system. For each point a condition, such as a value, of the operating characteristics is given. Alternatively, the reference profile may define a map of the part of the user's body to be treated. In one embodiment, the map is divided into predefined areas and a condition of the operating characteristics is given for each area.

The controller 40 may be configured to track the path of the hair cutting device 20 relative to the part of the body to be treated. The controller 40 may be configured to record the track of the path of the hair cutting device 20. That is, the controller 40 may be configured to determine the path of the hair cutting device 20 and cause information indicative of the path of the hair cutting device 20 to be stored by the RAM 110. Alternatively, the controller 40 is configured to cause the information to be stored by the memory 100.

The controller 40 may be configured to compare the information indicative of the path of the hair cutting device 20 with the reference profile providing information indicative of the part of the body to be treated. Therefore, the controller 40 is able to determine an area of the part of the body to be treated that has been treated. That is, the controller 40 is able to determine the area of the part of the body to be treated that has been treated based on the determined path of the hair cutting device 20 and, optionally, the width and/or footprint of the cutting unit 24. With such an arrangement the controller 40 is able to determine the area that the cutting unit 24 of the hair cutting device 20 has passed over. The controller 40 may be configured to record that an area of the part of the body to be treated has been treated when it is determined that the cutting unit 24 has passed over it along any path relative to the part of the body. In an alternative embodiment, the controller 40 is configured to record that an area of the part of the body to be treated has been treated when the controller 40 determines that the cutting unit 24 has passed over it along one or more predefined paths.

In an embodiment in which the controller 40 is configured to record that an area of the part of the body to be treated has been treated when the controller 40 determines that the cutting unit 24 has passed over it along one or more predefined paths relative to the part of the body to be treated, the one or more predefined paths are determined by the controller 40 referring to the reference profile. The reference profile provides information of a direction of growth of hair across the part of the body to be treated for each position of the hair cutting device 20 relative to the part of the body to be treated. The information stored by the reference profile may be predicted or recorded. Although in the present embodiment the reference profile provides information of a direction of growth of hair, in another embodiment the reference profile provides a desired path only for each position of the hair cutting device 20 relative to the part of the body to be treated. The information stored by the reference profile is communicated and stored with reference to a coordinate system. In one such configuration, use is made of a polar coordinate system in which each position on the part of the body to be treated is determined by a distance from a fixed point and an angle from a fixed direction. Another configuration uses a Cartesian coordinate system. For each point of the coordinate system, information indicative of the direction of growth of hair is given. Alternatively, the reference profile may define a map of the part of the user's body to be treated. In one embodiment the map is divided into predefined areas and information indicative of the direction of growth of hair is given for each area.

Although in the above described embodiments the image sensor is a depth image sensor, it will be understood that alternative imaging modules may be used. For example, alternative vision systems acting as an imaging module may be used. Such an alternative vision system may include a no-range image sensor, for example using an object reconstruction technique, or stereo vision, temporal analysis of video to reconstruct range data and detect the head position and hair cutting device position, analysis of thermal image sensor images, analysis of data from ultrasonic sensors, and/or analysis of data from capacitive sensors.

In the embodiments described herein, the system 10 is described with reference to the user of the system 10, being the person being treated. That is, the user uses the system to cut/shave their own hair. However, it will be understood that, in an alternative embodiment, the user is a person using the system 10 to cut/shave the body hair of another person.

Further alternative embodiments are conceivable wherein a hybrid system is used, wherein the feedback system provides the user with a rough position as to where the hair cutting device 20 is to be placed, and smaller-scale actuation directions are set on the hair cutting device 20, by way of e.g. haptic feedback.

It will be appreciated that the term "comprising" does not exclude other units or steps and that the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalization thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. A shaving guidance system for guiding a user during a shaving procedure, the system comprising:
an imaging module comprising an image sensor configured to register an image of a part of the body of the user,
an image data analyzer configured to determine a local hair-growth direction based on data in the image;
a controller configured to generate instructions about a direction in which a hair cutting device is to be moved over the body in dependence on the determined local hair-growth direction, and
a feedback system configured to provide the instructions to the user
wherein the imaging module is configured to create a 2D image in which each detected hair is represented by a line in the 2D image, and
wherein the image data analyzer is configured to determine the local hair growth direction of hairs from a skin surface using a propagation algorithm which starts determining the hair-growth direction from the skin surface in an initialization region using heuristic information on known hair growth directions, and determines the hair-growth direction of hairs in a neighboring region next to, or partly overlapping, the initialization region using an orientation of each of the lines representing the hairs and their relative position in the neighboring region with respect to the initialization region or region previously processed, wherein heuristic information on known hair growth directions comprises general knowledge gained by experience on known hair growth direction in humans.

2. The system according to claim 1, wherein the imaging module is configured to automatically register a sequence of 2D images, wherein the image data analyzer is configured to create a 3D image of the part of the body using the sequence of 2D images, the image data analyzer further being configured to determine the local hair growth direction by analyzing the 3D image.

3. The system according to claim 1, wherein the imaging module is configured to create a 3D image in which each detected hair is represented by a 3D line, the image data analyzer further being configured to determine the local hair growth direction by analyzing the 3D image.

4. The system according to claim 1, wherein the controller is configured to determine a preferred sequence of movements to be followed by the user based on the determined local hair-growth direction, and wherein the instructions relate to steps within the preferred sequence of movements.

5. The system according to claim 1, wherein the system comprises a position identifier configured to generate position information indicative of a position of the hair cutting device relative to the part of the body.

6. The system according to claim 5, wherein the controller is configured to monitor a trajectory of the hair cutting device using the position information.

7. The system according to claim 5, wherein the controller is configured to operate the feedback system to provide an indication to the user of a desired path and/or angle of orientation of the hair cutting device based on the position information.

8. The system according to claim 1, wherein the feedback system comprises a display module configured to display a representation of the part of the body and visual signs representing the instructions.

9. The system according to claim 1, wherein the feedback system comprises an audio module configured to produce the instructions in an audio format.

10. The system according to claim 1, wherein the feedback system comprises a haptic module configured to produce the instructions in a haptic format.

11. The system according to claim 1, wherein the system is embodied by a computing device, a mobile telecommunication device or a hand-held electrical hair cutting device.

12. The system according to claim 1, wherein the system further comprises a lighting unit configured to illuminate the part of the body so as to create shadows of the hairs on the skin of the user, wherein in the 2D image each detected hair is represented by a first line representing a hair and a second line representing a shadow of the hair, the image data analyzer being configured to determine the local hair growth direction of hairs using a meeting point of the first and second line.

13. The system according to claim 1, wherein the system comprises a base unit and a hair cutting device.

14. The system according to claim 13, wherein the base unit comprises the imaging module and the controller, and wherein the hair cutting device comprises the feedback system.

15. The system according to claim 13, wherein the base unit comprises the feedback system, and wherein the hair cutting device comprises the imaging module and the controller.

16. The system according to claim 13, wherein the base unit is embodied by a computing device or a mobile telecommunication device.

17. A method of guiding a user during a shaving procedure, the method comprising:
  making an image of a part of the body of the user, via an imaging module comprising an image sensor, the imaging module configured to register an image of a part of the body of the user,
  determining, by an image data analyzer, a local hair-growth direction on the body of the user using the image,
  generating instructions about a direction in which a hair cutting device is to be moved over the body in dependence on the determined local hair-growth direction, and
  providing the instructions to the user, and
  wherein the imaging module is configured to create a 2D image in which each detected hair is represented by a line in the 2D image, and
  wherein the image data analyzer is configured to determine the local hair growth direction of hairs from a skin surface using a propagation algorithm which starts determining the hair-growth direction from the skin surface in an initialization region using heuristic information on known hair growth directions, and determines the hair-growth direction of hairs in a neighboring region next to, or partly overlapping, the initialization region using an orientation of each of the lines representing the hairs and their relative position in the neighboring region with respect to the initialization region or region previously processed, wherein heuristic information on known hair growth directions comprises general knowledge gained by experience on known hair growth direction in humans.

* * * * *